H. C. WHITE.
STEREOSCOPE.
APPLICATION FILED MAR. 13, 1913.
1,118,455.
Patented Nov. 24, 1914.
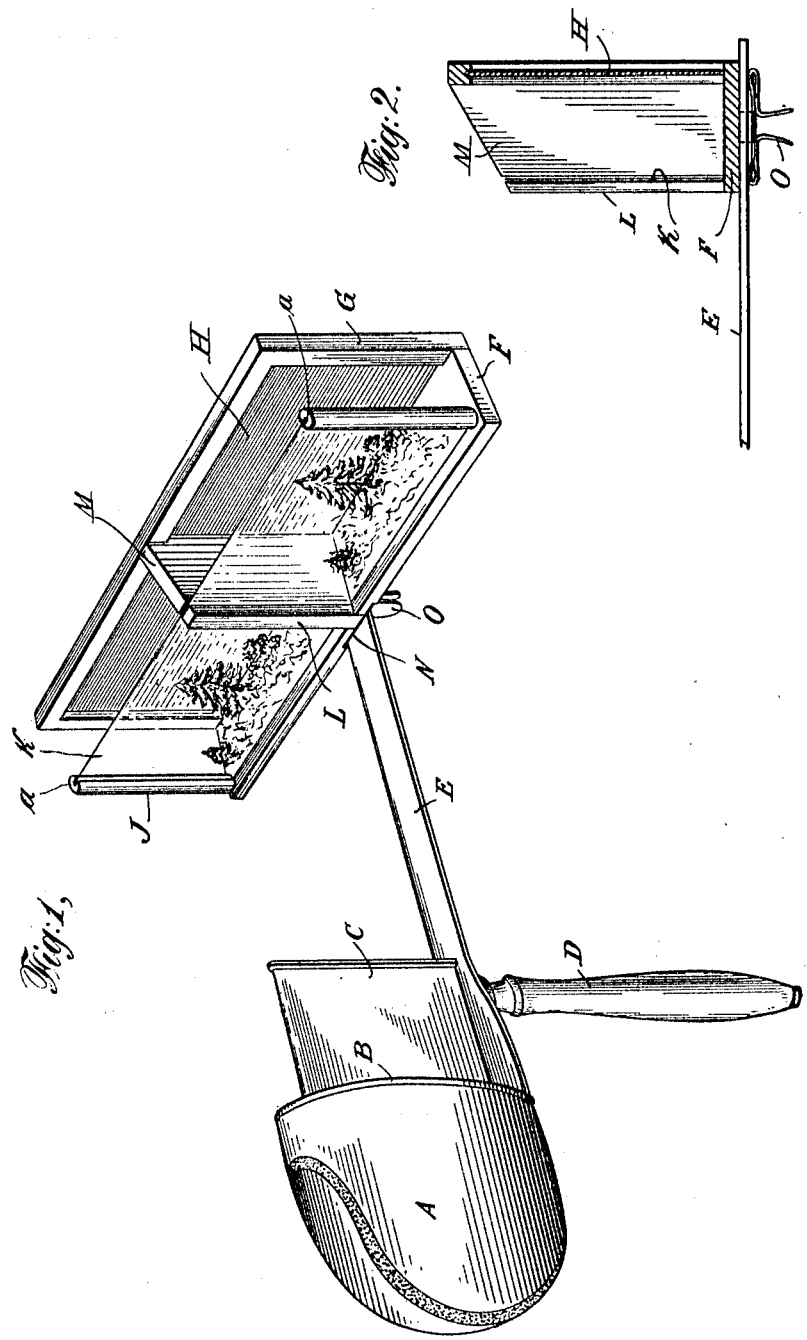
Witnesses:
Max B. A. Doring
Paul H. Franke
Inventor
Harrie C. White.
By his Attorneys
Brown, Raegener, Moody & Matty.

UNITED STATES PATENT OFFICE.

HARRIE C. WHITE, OF NORTH BENNINGTON, VERMONT.

STEREOSCOPE.

1,118,455. Specification of Letters Patent. Patented Nov. 24, 1914.

Application filed March 13, 1913. Serial No. 753,901.

*To all whom it may concern:*

Be it known that I, HARRIE C. WHITE, a citizen of the United States, residing at North Bennington, in the county of Bennington and State of Vermont, have invented certain new and useful Improvements in Stereoscopes, of which the following is a specification.

This invention relates to stereoscopes, more particularly to stereoscopes for viewing transparent stereoscopic pictures, and the objects of the invention are to provide means for suitably holding and screening flexible transparent stereoscopic pictures on an ordinary stereoscope.

To the accomplishment of the above objects and to such others as may hereinafter appear, the invention comprises a holder provided with means for supporting a flexible transparent stereoscopic picture, said holder being provided with means for screening the light in the rear of said supporting means, so that the stereoscopic effect of the picture can be very clearly obtained when viewed through the stereoscope.

In the drawings: Figure 1 is a perspective view of a stereoscope and holder made in accordance with the invention. Fig. 2 is a transverse section of the holder.

Referring to the drawings, A designates the hood of the stereoscope, B the edge of the lens-frame, C the septum, D the handle, and E the shaft, all of which may be constructed in any desired manner.

Upon the shaft E is mounted my improved holder which, in the present instance comprises a base F upon the rear edge of which is mounted the screen frame G in which is supported the screen H. Upon the front edge of the base F is mounted the guide supports J having suitable grooves *a* for supporting the ends of the flexible transparent stereoscopic picture K, the center of which is supported by means of a central guide member L secured to the base. To the center of the base F and immediately behind the central guide L is secured a septum or partition M the back of which is secured to the screen frame G. In the bottom of the base F is provided a transverse groove N which fits over the shaft E, a suitable clamp O secured to the base F being provided for holding the holder in any desired position on the shaft.

The holder made in accordance with this invention, and as above described is adapted for viewing stereoscopic pictures printed from a negative upon a flexible photographic film so as to produce a transparent stereoscopic picture represented in the drawings by the letter K. The screen H is made of ground glass or preferably ground film or tracing cloth which is lighter and less liable to be broken. The screen H is placed on the holder at such a distance from the supports for the transparent stereoscopic picture that the screen will not be in focus with the picture, when viewed through the stereoscope in the usual manner. The screen H also prevents the picture being obscured by seeing things in back of the picture, the screen admitting light so as to clearly bring out the smallest details of the picture.

The septum or partition M is provided for doing away with shadows cast by the screen frame, when the light falls at an angle to the holder. The front edge of the septum also acts as a support or guide in connection with the guide L. It is also to be noted that the top of the screen frame extends above the top of the picture K as clearly shown in Fig. 2, to obviate casting shadows on the picture.

Stereoscopic pictures printed upon a flexible photographic film produces a transparent flexible positive picture that is far superior to a similar picture printed on opaque paper, and the present holder is particularly adapted to hold such flexible transparent pictures. The flexible transparent pictures are held in alinement and prevented from bending or buckling by means of the guides J, which are made the full length of picture film, together with the central guide L and the septum M.

While the invention has been described with particular reference to the details of construction, the same is not to be considered as limited thereto, as many changes may be made and still fall within the scope of the following claims.

What I claim is:—

1. A stereoscope comprising in combination a holder for holding a flexible transparent stereoscopic picture, holding means on said holder for holding the two ends and middle portion of said picture, and a light transmitting screen mounted on said holder in the rear of said holding means as and for the purposes set forth.

2. A stereoscope comprising in combination a holder for holding a flexible transparent stereoscopic picture, holding means secured to the ends of said holder for holding the ends of said picture for its entire width, a light transmitting screen mounted on said holder in the rear of said holding means, a partition mounted on said holder midway between said holding means, and central holding means in addition to said partition for holding the middle portion of said picture as and for the purposes set forth.

3. A stereoscope comprising in combination a holder for holding a flexible transparent stereoscopic picture, holding means on said holder for holding the two ends and middle portion of said picture, a light transmitting screen mounted on said holder in the rear of said holding means, and a partition on said holder midway between the ends of said holder as and for the purposes set forth.

In testimony whereof I have signed this specification in the presence of two subscribing witnesses.

HARRIE C. WHITE.

Witnesses:
IRVING C. COBB,
A. M. KEYES.

Copies of this patent may be obtained for five cents each, by addressing the "Commissioner of Patents, Washington, D. C."